(12) United States Patent
Hultstrand

(10) Patent No.: US 6,575,511 B2
(45) Date of Patent: Jun. 10, 2003

(54) APPARATUS FOR REMOVING SNOW FROM MOTOR VEHICLES

(76) Inventor: Winston R. Hultstrand, 14658 Berwin Rd., Ely, MN (US) 55731

( * ) Notice: Subject to any disclaimer, the term of this patent is extended or adjusted under 35 U.S.C. 154(b) by 0 days.

(21) Appl. No.: 10/014,635

(22) Filed: Oct. 22, 2001

(65) Prior Publication Data

US 2003/0075938 A1 Apr. 24, 2003

(51) Int. Cl.$^7$ ................................................. E01H 5/02
(52) U.S. Cl. ........................... 294/54.5; 294/51; 294/55; 15/105; 15/236.01
(58) Field of Search .............................. 294/2, 19.1, 24, 294/49, 51, 54.5, 55; 7/114, 116, 158; 15/105, 111, 236.01, 236.02, 236.05–236.09; 30/169, 172; 37/196, 241, 265, 267, 284, 285, 375; 172/375

(56) References Cited

U.S. PATENT DOCUMENTS

| | | | | |
|---|---|---|---|---|
| 1,434,744 A | * | 11/1922 | HIbbler | ............... 15/236.05 |
| 2,299,418 A | * | 10/1942 | Thomas | ................... 294/51 X |
| 2,639,454 A | | 5/1953 | Dory | |
| 3,036,322 A | * | 5/1962 | Jorgensen | ................ 15/111 |
| D193,439 S | * | 8/1962 | Severance | ............. 294/54.5 X |
| 3,051,975 A | * | 9/1962 | Schwartz | ..................... 15/105 |
| D241,410 S | * | 9/1976 | Atkinson | ................... 7/114 X |
| 4,164,801 A | * | 8/1979 | Thomas | ................... 15/236.02 |
| D267,468 S | * | 1/1983 | Simms | ................ 294/54.5 X |
| D296,410 S | * | 6/1988 | Abbott | ................. 294/54.5 X |
| 4,947,562 A | * | 8/1990 | Williamson | ........... 294/54.5 X |
| 4,993,768 A | | 2/1991 | Ewen | |
| D345,640 S | | 3/1994 | Galati | |
| 5,486,027 A | | 1/1996 | Dionne et al. | |
| D378,322 S | | 3/1997 | Young | |
| 5,850,657 A | * | 12/1998 | List et al. | ..................... 15/105 |
| 6,092,255 A | | 7/2000 | Kim | |

* cited by examiner

Primary Examiner—Dean J. Kramer
(74) Attorney, Agent, or Firm—Moore, Hansen & Sumner

(57) ABSTRACT

An apparatus for removing snow and other accretions from difficult to reach areas of motor vehicles. The apparatus comprises an elongated body having opposing first and second ends. The first end comprises an extension that is angled and laterally flared with respect to the elongated body, and which terminates in a substantially transverse edge. The extension is provided with a pair of sidewalls and a rib that provide rigidity and strength thereto, and whose edges may be used for scraping and chipping. The second end of the apparatus comprises a scoop-shaped body that is substantially aligned with the longitudinal axis of the elongated body and which terminates in a curved edge. The different configurations and orientations of the first and second ends enable the apparatus to easily remove snow and other accretions from such hard to reach areas as fender wells and mud flaps.

9 Claims, 3 Drawing Sheets

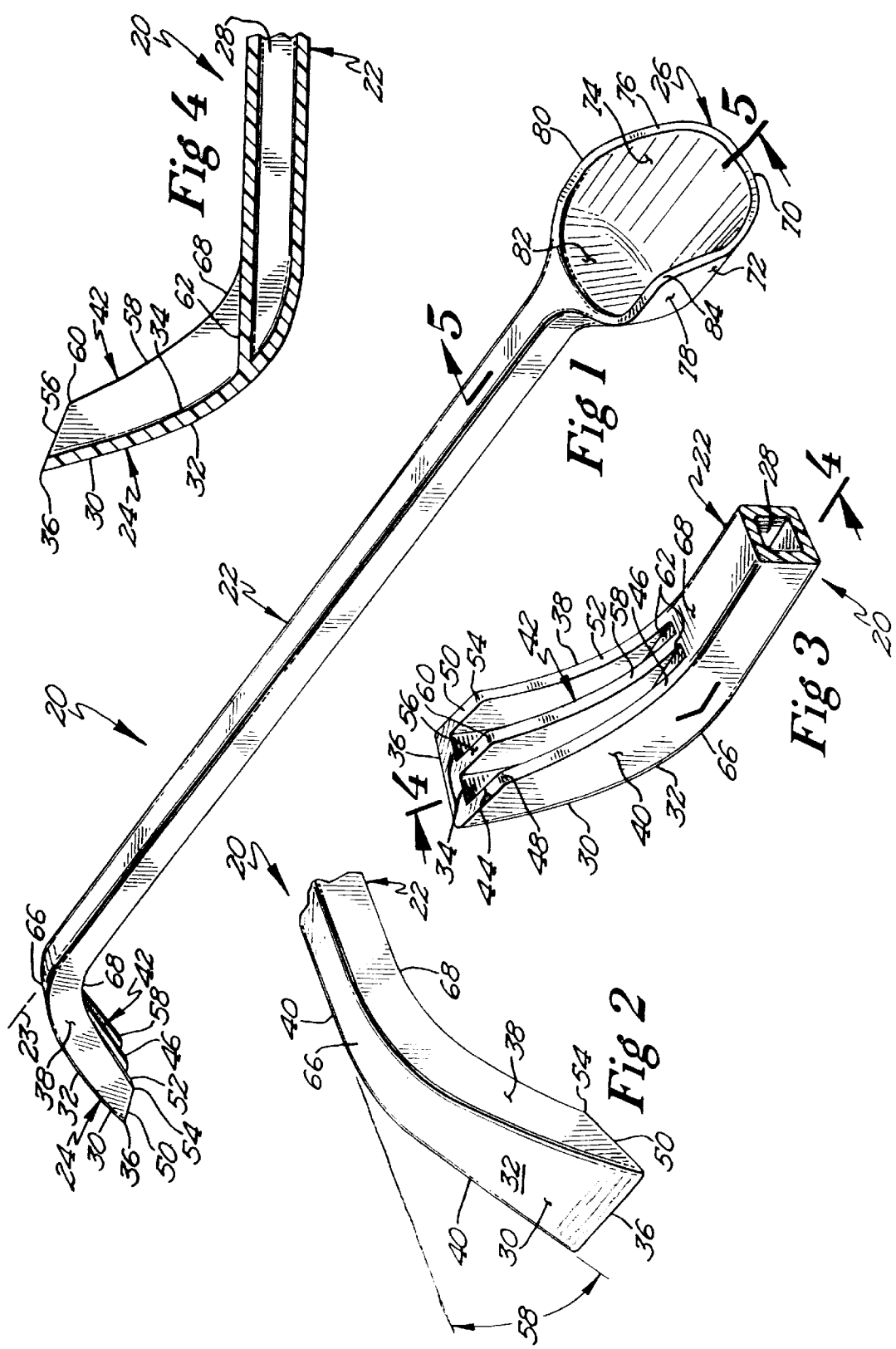

APPARATUS FOR REMOVING SNOW FROM MOTOR VEHICLES

FIELD OF THE INVENTION

This invention relates generally to devices used to remove snow from vehicles. More particularly, this invention pertains to an apparatus that is configured and arranged to remove accretions of snow from difficult to reach areas of motor vehicles.

BACKGROUND OF THE INVENTION

In areas that experience winter conditions where temperatures fall below freezing, is not uncommon for snow and frost to accumulate on windows and upwardly facing surfaces of vehicles that are not in some way sheltered from the weather. This can be problematic, because in order to operate a vehicle safe and legal manner, the snow and frost have to be removed. Accumulations of snow can often be removed by using one's appendages, but this method of snow removal is not particularly efficient, nor is it pleasant especially if one is not properly dressed for the occasion. Frost, on the other hand, is not easily removed by hand, and this has led to the development of specialized devices that are designed to scrape frost from window surfaces (See, for example, U.S. Patents: U.S. Pat. No. D345,640 issued to Galati, Mar. 29, 1994; U.S. Pat. No. D378,322, issued to Young, Mar. 11, 1997; U.S. Pat. No. 2,639,454, issued to Dory, May 26, 1953; and U.S. Pat. No. 6,092,255, issued to Kim, Jul. 25, 2000).

The scrapers of these devices are usually oriented transversely to the body of the device and configured to engage a window surface as the device is moved in sliding contact therealong. Since snow is often associated with frost, these aforementioned devices are often equipped with a snow removal tool such as a brush, to make the device multifunctional. Usually the brush is substantially larger than the scraper so that it may quickly sweep accumulations of snow from a vehicle. Because of the inherently different uses, the scraper and brush are usually positioned so that only one or the other may be used at any one time. Note that the scraper and brush may be located at one end (in opposing relation) or at opposite ends.

In such abovementioned areas, snow often accumulates on the ground and it is also not uncommon for vehicles, upon encountering such accumulations, to experience loss of traction or become stuck. This has led to the development of other devices that are designed to remove snow from around and/or beneath vehicles (See, for example, U.S. Patents: U.S. Pat. No. 4,993,768, issued to Ewen, Feb. 19, 1991; and U.S. Pat. No. 5,486,027, issued to Dionne et al., Jan. 23, 1996). These aforementioned devices are designed to be multifunctional and may be used as shovels, traction mats, and signaling devices. Thus, these devices are robustly constructed and sized so that they are able to excavate snow and are capable of supporting the weight of a vehicle as it is driven thereupon.

In these aforementioned areas it is also not uncommon for snow to form accretions on a vehicle. That is, snow is picked-up in the treads of tires and flung, by centrifugal force, onto the interior surfaces of wheel wells and other adjacent undersurfaces of a vehicle. This snow often is a mixture of water, snow, road salts, sand, and other debris. The problem is that when a vehicle is moved into a sheltered area, such as a warm garage, the accretions start to melt. And as they melt, they fall onto the floor of the shelter. As the accretion melts further, the liquefied portion starts to spread out along the floor seeking its own level and this leaves a mess. When the liquefied portion later evaporates, road salts come out of solution and form crystalline deposits on the floor of the shelter. Heavier particles such as sand and dirt tend to drop out of solution early on and do not usually form such concentrations, but nonetheless form deposits.

The problem is that these salts and sands need to be removed because they are detrimental to the floor surface. That is, they can damage the floor surface physically and chemically, and may get introduced into cracks that can lead to additional, internal damage. Moreover, they are generally unsightly. Alternatively, the accretions may only melt enough so that they simply fall to the floor of a shelter, and the floor is cold enough to enable the accretions to freeze thereon. In this situation, the accretions need to be removed because they interfere with the normal operation of the vehicle as it moves into and out of the shelter, and they are also generally unsightly.

Additionally, not all of the snow accretions are able to freely fall away from the vehicle. That is, some of the accretions fall or flow along vehicle surfaces into internal areas that are inaccessible. When this happens, the salts and sand may accumulate in these inaccessible areas where they are periodically re-wetted by additional fluids and liquefied accretion material. This can form highly corrosive environments that oxidize metals at an accelerated rate, and this can easily lead to premature rust-through. Manufactures have attempted to alleviate this problem by providing wheel well liners of rust-resistant materials. These have helped to mitigate the problem of rust-through, though they have not eliminated it completely.

Another problem associated with wheel well accretions it that they may become dislodged while the vehicle is in motion. When this occurs, the accretion falls to the roadbed and into the path of trailing or oncoming traffic. As one may expect, this presents a dangerous situation because an impact with a sufficiently large accretion may cause damage to a vehicle, and avoidance maneuvers may cause the driver of the vehicle to lose control and have an accident.

Yet another problem associated with wheel well accretions is that they may accumulate to such a degree that they interfere with the normal operation of the vehicle, such as turning.

While the abovementioned snow and frost removal devices address the problems of snow and frost accumulating on and about a vehicle, they do not address the problem of snow accretions forming on vehicles, nor would they be suitable for use as wheel well scrapers.

There is a need for a device that is able to remove accretions of snow and other material from hard to reach locations of vehicles. There is also a need for a device that can be used on a variety of differently contoured surfaces. And there is also a need for a device that is lightweight and easily manipulated.

SUMMARY OF THE INVENTION

The purpose of the present invention is to provide a lightweight, maneuverable, apparatus having a plurality of working edges that are arranged and configured to remove accretions of material that accumulate in areas that are relatively difficult to access, namely wheel wells. The apparatus comprises three main parts, an elongated body, a first end, and a second end.

The elongated body is a somewhat slender shaft that is configured to be grasped and used as a handle. Thus, it will be appreciated that the body is configured to permit maximum efficient use of the first and second ends when the apparatus is being manipulated by a user. The body is in the range of one to four feet in length, but it is understood that other lengths may be used. Preferably, the shaft is hollow along its longitudinal extent to reduce the weight of the body and permit the apparatus to be more easily wielded by the user.

Generally, the first end of the apparatus is laterally flared and angled with respect to the longitudinal axis of the elongated body and terminates in a working edge. More specifically, the first end comprises an extension that is laterally flared and angled with respect to the longitudinal axis of the elongated body. This extension is provided with sidewalls and a rib that are arranged and configured to maintain the extension at a predetermined angle. Preferably, the predetermined angle is in the range of around sixty to eighty-five degrees with respect to the longitudinal axis of the elongated body. The extension projects beyond the plane of the elongated body a distance sufficient to allow the working edge of the extension to be able to slidingly contact the interior surface(s) of the wheel well as it moves thereacross. As will be appreciated, the working edge is symmetrically arranged relative to the longitudinal axis of the elongated body to enable the apparatus to be worked from different directions with equal facility.

The second end of the apparatus is generally in alignment with the longitudinal axis of the elongated body and comprises a wall that also terminates in a working edge. More particularly, the second end comprises a curved wall that extends from the elongated body in a generally collateral direction and has a working edge that is oriented on a bias with respect to the wall. The wall and its working edge are shaped so that the working edge of the second end is able to slidingly contact the inner surfaces of a wheel well as it moves therealong. As will be appreciated, the particular wall configuration of the apparatus will depend upon the particular surfaces to be cleaned. And, while a curved wall is desirable so that it may be used on a variety of surfaces, it is understood that other wall configurations are possible.

In use, the first end may be used to scrape accretions from the interior of a wheel well by pushing and/or pulling the apparatus transversely across the surface being cleaned. The first end may also be used as a pry-bar or lever to separate accretions from the wheel well surfaces, using the curved transition areas between the extension and the elongated body as pivots for the inner and outer surfaces. The apparatus may also be turned over so that the sidewall edges and the rib edge may be used to fracture or chip away larger accretions using a hammer-like motion.

Both the inner and outer surfaces of the second end may be used to scrape accretions from the interior of a wheel well by selectively turning the apparatus over and pushing the working edge along the surface being cleaned. The second end may also be used to remove accretions in a pushing and twisting motion, similar to removing cores from a larger mass of material. It will be appreciated that the aforementioned methods of use are merely some of the possible different motions that are possible using the apparatus.

It is an object of the present invention to provide an apparatus that may be used to remove accretions of material from difficult to access areas of vehicles.

Another object of the invention to prevent accretions of snow from being transported into enclosures such as garages.

A feature of the present invention is that it is lightweight and easily manipulated.

Another feature of the invention is that it has two differently configured ends that have differently configured working edges.

Yet another feature of the invention is that accretions of snow may be dislodged from a vehicle by using pushing, levering, hammering, and twisting motions. Still another feature of the present invention is that the working edges at the ends are symmetrically shaped.

An advantage of the present invention is that the symmetrically shaped working edges allow the apparatus to be maneuvered into position from opposing directions.

These and other objects, features and advantages of the present invention will become apparent from the following detailed description thereof taken in conjunction with the accompanying drawing, wherein like reference numerals designate like elements throughout the several views.

BRIEF DESCRIPTION OF THE DRAWINGS

FIG. 1 is a perspective view of a preferred embodiment of the invention illustrating the orientation of the first and second opposing ends;

FIG. 2 is a partial, perspective view of the exterior surface of the first end of the preferred embodiment;

FIG. 3 is a partial, perspective view of the interior surface of the first end as depicted in FIG. 2;

FIG. 4 is a partial, sectional view of the first end illustrating the arrangement and orientation of the walls and edges of the first end;

DESCRIPTION OF THE PREFERRED EMBODIMENT

Figure 5:
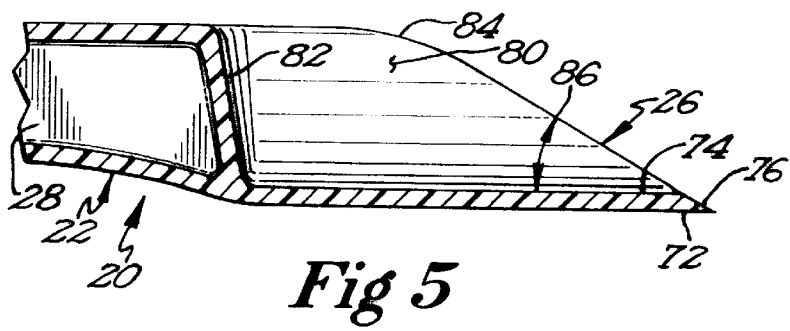
FIG. 5 is a partial, perspective view of the exterior surface of the second end of the preferred embodiment.

Referring to FIG. 1, the snow removal apparatus 20 of the present invention comprises an elongated body 22 with a first end 24 and a second end 26. As can be seen, the elongated body 22 is a substantially linear shaft that is configured to be grasped by a user of the apparatus 20. As will be appreciated, the elongated body has a cross-sectional area that is somewhat squared (See, FIGS. 2, 3, 5, and 6). This configuration is preferred because it facilitates gripping by gloved hands, and allows greater control and resistance to rotation. Note that the elongated body 22 includes a cavity 28 substantially along its longitudinal extent. As will be appreciated, the provision of the cavity 28 reduces the overall weight of the apparatus 20 and enables the apparatus to be more easily manipulated by a user. Because the apparatus 20 is intended to be used on a wide variety of vehicles, the preferred length of the elongated body 22 is generally around one to four feet. Although not shown, it is envisioned that the length of the elongated body be variable. For example, by having connectable sections, or having sections that fold or telescope relative to each other. Moreover, it is envisioned that the ends of the apparatus be removably attachable to the elongated body to permit the apparatus to be tailored to a particular vehicle's dimensions. Note in the figure that the first end 24 is angled with respect to the elongated body 22. This angled relation positions the working edge 36 of the first end 24 in an offset orientation with respect to the longitudinal axis of the body 22 at a range of around sixty to eighty-five degrees, and preferably around seventy-five degrees. As depicted, the first end 24 flares out laterally as it terminates in its working edge 36. Note that the working edge 36 is transverse to the longitudinal axis of the elongated body 22. The second end 26, on the other hand, is generally aligned with the longitudinal axis 23 of the elongated body 22 so that its working edge 76 is generally within the plane of the elongated body 22. Note that the second end 26 also flares out laterally, but then it tapers inwardly to a rounded end. Thus, the snow removal apparatus 20 has two distinctly configured and arranged working surfaces 36, 76 with which to remove accretions from vehicles.

Referring now to FIG. 2 the first end 24 will be described in greater detail. The first end 24 comprises an extension 30 that is angled with respect to the elongated body 22 and which has an outer surface 32 and an inner surface 34 (See, FIGS. 3 and 4). Preferably, the extension 30 is contiguous with the elongated body 22 so that there is a smooth transition therebetween. This transition facilitates insertion and withdrawal of the apparatus into an area to be cleaned, and provides a surface that may be used as a pivot area 66 when the first end is used as a pry-bar. It will be appreciated that the extension 30 is provided with sidewalls 38, 40 that add strength and rigidity to the extension 30 and also maintain the extension's angular relation relative to the elongated body 22. Continuing to the end, the extension 30 terminates in a working edge 36 that is used to slidingly contact a surface to be cleaned or otherwise cleared of accretions. As noted above, the working edge 36 is preferably transversely oriented relative to the elongated body 22 so that the first end 24 is easier to control when it is used as a scraper.

FIG. 3 shows the first end 24 of FIG. 2 from another perspective. Here, the inner surface 34 of the extension 30 is visible, along with the sidewalls 38, 40 and a reinforcing rib 42. The sidewalls 30, 40 and rib 42 include working edges that allow the first end to be used as a chipper to remove and/or reduce accretions. As depicted, sidewall 40 includes working edges 44, 46 that are angled with respect to each other and form an apex 48 that may be used as a striking surface when the device is used as a chipper. Similarly, sidewall 38 includes working edges 50, 52 that form an apex 54, and rib 42 includes working edges 56, 58 that form an apex 60. Thus, in this embodiment, the first end 24 includes three chipping apexes 48, 54, and 60. Preferably, working edges 44, 50, and 56 are in planar alignment with working edge 36 so that the first end 24 may be used as a scraper in a plurality of orientations, and to provide the maximum support therefore. The other working edges 46, 52 and 58 are also depicted as being in planar alignment with each other. However, it should be understood that their particular configurations may vary with respect to each other. For example, the edges may be erose or saw-toothed. Or, the working edge 58 of the rib 42 may project beyond the working edges 46, 52 of the sidewalls 40, 38 to present a first or primary striking edge.

Referring to FIG. 4, the sidewall 38 is shown as it maintains the extension 30 and the elongated body 22 at a predetermined angular relation. Here, the planar relation between the working edge 36 of the extension 30 and the working edge 50 of the sidewall 38 as well as the apex 54 formed by the sidewall working edges 50, 52 can be seen clearly. Note that the first end 24 also includes a rear wall 62 that forms a barrier to the cavity 28 of the elongated body. Obviously, such a wall would not be necessary if the elongated body were constructed from a solid block of material. However, the cavity 28 is preferred because the resultant apparatus is lighter and easier to manipulate.

Referring to FIG. 5, the second end 26 will be described in greater detail. The second end 26 comprises a wall 70 that is generally coplanar with respect to the elongated body 22 and which has an outer surface 72 and an inner surface 74 (See, FIGS. 6 and 7). Preferably, the wall 70 is contiguous with the elongated body 22 so that there is a smooth transition therebetween. This transition also facilitates insertion and withdrawal of the apparatus into an area to be cleaned. As with the first end 24, the second end 26 is provided with sides 78, 80 that add strength and rigidity to the wall 70. Continuing to the end, the wall 70 terminates in a working edge 76 that is used to slidingly contact a surface to be cleaned or otherwise cleared of accretions. Unlike the working edge of the first end 24, the working edge 76 of the second end is curved to facilitate insertion into an accretion. Also, unlike the working edge of the first end, the working edge 76 of the second end makes a smooth transition with the sides 78, 80 and the elongated body 22. As will be appreciated, the second end 26 may slidingly contact a surface to be cleaned so that a substantial portion of the working edge 76 is in contact with the surface and the accretion rides up on the exterior surface 72. It will also be appreciated that the sides 78, 80 have pivot areas 84 that may also serve as a fulcrum to assist in dislodging accretions from a surface to be cleaned.

Figure 6:
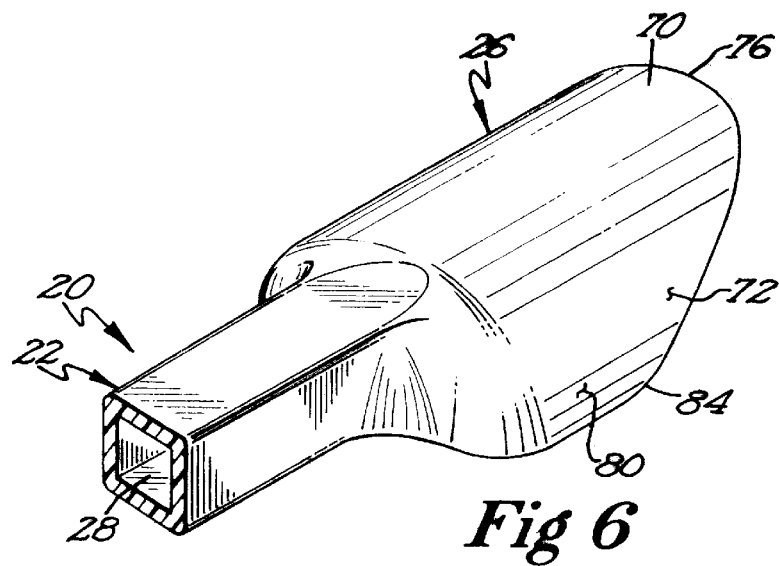
FIG. 6 is a partial, perspective view of the interior surface of the second end as depicted in FIG. 5.

Referring to FIG. 6, the second end 24 is depicted from another perspective. Here, the inner surface 74 of the wall 70 is visible, along with the sides 78, 80. Note that the sides 78, 80 and the wall 70 form a curved wall that is substantially aligned with the elongated body 22 in an offset relation. The second end 24 also includes a rear wall 82 that, when combined with the curved wall, forms a scoop having a common working edge 76. As will be appreciated, the second end 26 may have other configurations.

Figure 7:
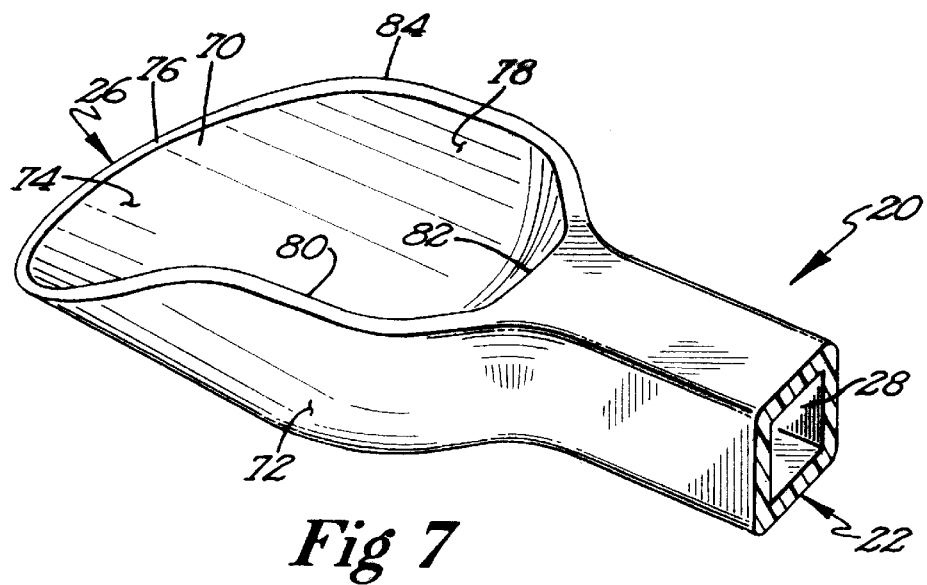
FIG. 7 is a partial, cross-sectional view of the second end illustrating the arrangement and orientation of the walls and edges of the second end.

Referring now to FIG. 7, the side 78 is shown as it is maintains the wall 70 and the elongated body 22 at a planar relation. As depicted, the working edge 76 extends substantially along the length of the second end 26 and transitions with the elongated body 22. Note that a portion of the working edge 76 is rather linear and forms an angle 86 with the wall 70. The angle 86 is in the range of thirty to fifty, degrees, and preferably around forty degrees. It will be appreciated that the linear portion of the working edge 76 allows the second end 26 to be used to scrape or otherwise dislodge accretions from planar surfaces. The second end 26 also includes a rear wall 82 that forms a barrier to the cavity 28 of the elongated body. As with the first end, such a wall would not be necessary if the elongated body were constructed from a solid block of material. However, the cavity 28 is preferred because the resultant apparatus is lighter and easier to manipulate.

Figure 8:
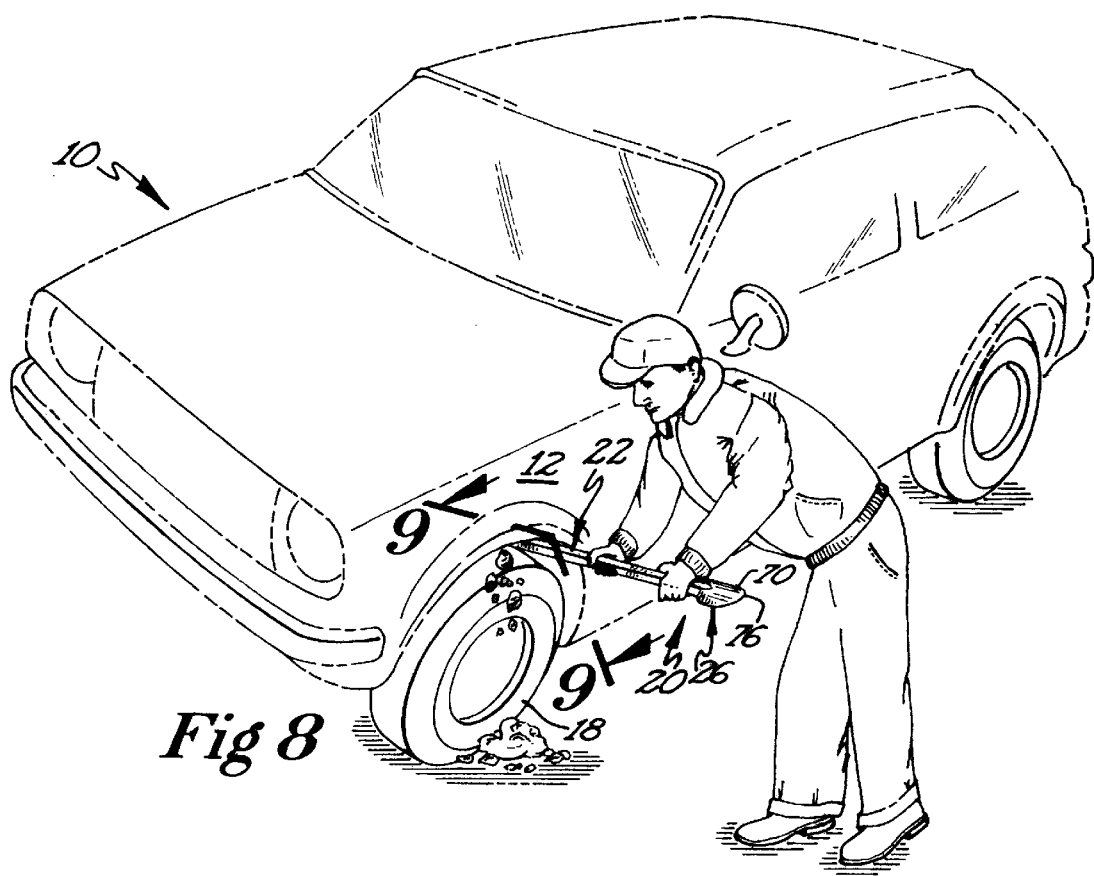
FIG. 8 is a depiction of a person using the preferred embodiment to clean the wheel well of a vehicle; and, FIG. 9 is a cross-sectional view illustrating the first end of the preferred embodiment of the invention as it is used to scrape accretions from a wheel well of a vehicle.

Referring now to FIG. 8, the apparatus 20 is depicted as it would be used to remove accretions of snow from a wheel well of a vehicle 10, prior to sheltering the vehicle 10. Here, a person is removing accretions from the left front wheel well of a vehicle by inserting the apparatus between the tire and the wheel well interior surface and working it against the interior surface. Because of the symmetrical nature of the apparatus, it will be appreciated that the apparatus may be used with equal facility from the forward and rearward directions as well as a transverse direction relative to the wheel well. Moreover, it will be appreciated that the same symmetrical nature allows the apparatus to be used on all of the other wheel wells with equal effectiveness. Although not depicted, it should be apparent that the apparatus will also be able to remove accretions from other locations on a vehicle, such as a mud flaps or other undersurfaces.

Figure 9:
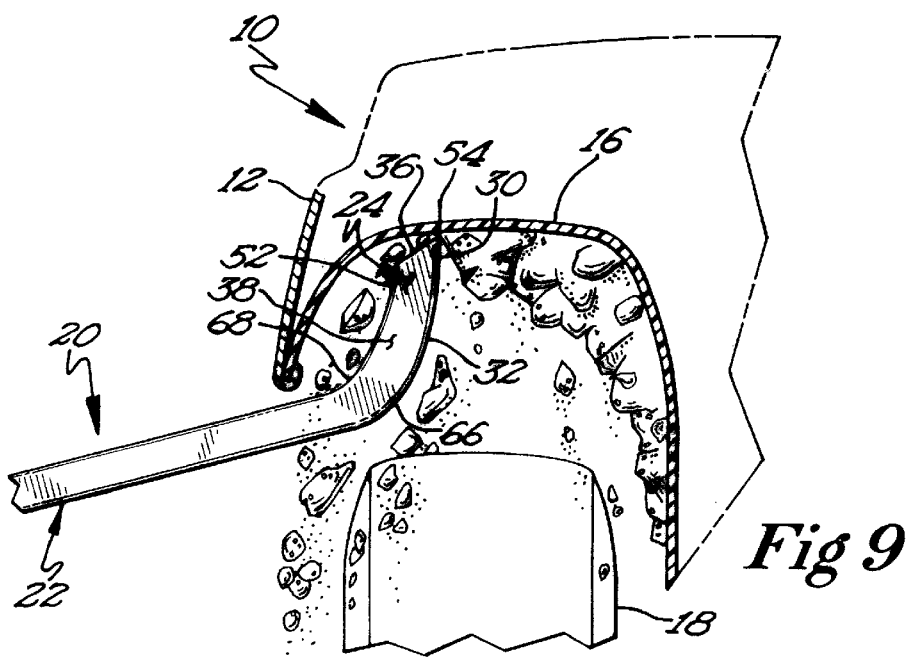

Referring to FIG. 9, the apparatus 20 is depicted as it dislodges accretions from a wheel well of a vehicle 10. As can be seen the first end 24 of the apparatus 20 is used to scrape the inner liner 16 of a wheel well of a front fender 12. In use, the working edge 36 of the first end 24 is used to scrape across the inner liner 16 in a cross-wise, pushing and/or pulling motion. Sometimes, the accretion may be dislodged in a single mass by using the first end 24 as a lever to separate the accretion from the inner liner 16. As depicted, a portion of the fender 12 may be used as a fulcrum about which the pivot area 68 of the first end 24 may be rotated. Thus, the exterior surface 32 is used to dislodge the accretion. It will be appreciated that the opposing pivot area 66 and inner surface 34 may also be used in the same manner.

Thus described, this invention provides an apparatus that permits a user to remove accretions of snow and the like from a vehicle prior to sheltering said vehicle.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for removing accretions of snow from surfaces of vehicles, said apparatus comprising:

an elongated body having a longitudinal axis, said elongated body comprising a first end and a second end;

said first end comprising an extension that flares laterally with respect to the longitudinal axis of said elongated body and which terminates in a first working edge; said first end further comprising side walls and a rib, with said rib positioned between and in alignment with said side walls, with said rib and said sidewalls configured to maintain said extension at a predetermined angle with respect to the longitudinal axis of said elongated body;

said second end comprising a body having a wall that is in substantial coaxial alignment with respect to the longitudinal axis of said elongated body with said wall including a second working edge;

wherein accretions of snow may be removed from a variety of differently configured surfaces of a vehicle by manipulating the first and second working edges thereagainst.

2. The snow removal apparatus of claim 1, wherein said first working edge is substantially transverse with respect to the longitudinal axis of said elongated body.

3. The snow removal apparatus of claim 1, wherein said second working edge defines a plane that is angled with respect to the longitudinal axis of said elongated body.

4. The snow removal apparatus of claim 1, wherein said second working edge is curved.

5. An apparatus for removing accretions of snow from surfaces of vehicles, said apparatus comprising:

an elongated body having a longitudinal axis, said elongated body comprising a first end and a second end with the first end comprising an extension that is oriented at a predetermined angle with respect to the longitudinal axis of said elongated body and which terminates at a working edge; said first end further comprising side walls and a rib, with said rib positioned between and in alignment with said side walls, with said rib and said sidewalls configured to maintain said extension at a predetermined angle with respect to the longitudinal axis of said elongated body;

wherein a user of said apparatus is able to remove accretions of snow from a variety of differently configured surfaces of a vehicle by manipulating the working edge of said extension thereagainst.

6. The snow removal apparatus of claim 5, wherein said extension is laterally flared with respect to the longitudinal axis of said elongated body.

7. The snow removal apparatus of claim 5, wherein said body further comprises a curved wall.

8. The show removal apparatus of claim 5, wherein said predetermined angle is about 30–80 degrees.

9. The snow removal apparatus of claim 5 wherein said predetermined angle is about 60–75 degrees.

* * * * *

UNITED STATES PATENT AND TRADEMARK OFFICE
CERTIFICATE OF CORRECTION

PATENT NO. : 6,575,511 B2 Page 1 of 1
DATED : June 10, 2003
INVENTOR(S) : Winston R. Hulstrand It is certified that error appears in the above-identified patent and that said Letters Patent is hereby corrected as shown below:

<u>Column 8,</u>
Line 42, delete "show" and insert therefor -- snow --.

Signed and Sealed this

Thirty-first Day of August, 2004

JON W. DUDAS
*Director of the United States Patent and Trademark Office*